US012744578B2

(12) United States Patent
Matsumura et al.

(10) Patent No.: US 12,744,578 B2
(45) Date of Patent: Sep. 22, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Weiqi Sun, Beijing (CN); Lan Chen, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 302 days.

(21) Appl. No.: 18/292,567

(22) PCT Filed: Jul. 30, 2021

(86) PCT No.: PCT/JP2021/028312
§ 371 (c)(1),
(2) Date: Jan. 26, 2024

(87) PCT Pub. No.: WO2023/007698
PCT Pub. Date: Feb. 2, 2023

(65) Prior Publication Data

US 2024/0356617 A1 Oct. 24, 2024

(51) Int. Cl.
*H04W 24/10* (2009.01)
*H04B 7/06* (2006.01)
*H04B 17/318* (2015.01)

(52) U.S. Cl.
CPC ......... *H04B 7/0695* (2013.01); *H04B 7/0626* (2013.01); *H04B 17/328* (2023.05)

(58) Field of Classification Search
CPC ...... H04B 17/328; H04B 7/06; H04B 7/0626; H04B 7/0695; H04W 16/28; H04W 24/10
See application file for complete search history.

(56) References Cited

U.S. PATENT DOCUMENTS

| | | | | |
|---|---|---|---|---|
| 2021/0119688 | A1* | 4/2021 | Enescu | H04W 52/0229 |
| 2021/0258061 | A1* | 8/2021 | Harrebek | H04B 7/06966 |
| 2022/0053353 | A1* | 2/2022 | Lee | H04B 7/0626 |
| 2023/0387992 | A1* | 11/2023 | Guo | H04B 7/088 |
| 2024/0097763 | A1* | 3/2024 | Yuan | H04B 7/0691 |

FOREIGN PATENT DOCUMENTS

| | | | |
|---|---|---|---|
| WO | WO-2019124983 A1 * | 6/2019 | H04W 72/23 |

OTHER PUBLICATIONS

International Search Report issued in PCT/JP2021/028312 on Feb. 22, 2022 (5 pages).
Written Opinion of the International Searching Authority issued in PCT/JP2021/028312 on Feb. 22, 2022 (4 pages).

(Continued)

*Primary Examiner* — Phuc H Tran
(74) *Attorney, Agent, or Firm* — Osha Bergman Watanabe & Burton LLP

(57) ABSTRACT

A terminal according to one aspect of the present disclosure includes a control section that selects a beam to be reported, based on at least one of an uplink (UL) beam quality and a downlink (DL) beam quality, and a transmitting section that transmits a beam report including at least one of the UL beam quality and the DL beam quality of the selected beam. According to one aspect of the present disclosure, a report (CSI report) related to a beam can be appropriately executed.

4 Claims, 16 Drawing Sheets

(56) References Cited

OTHER PUBLICATIONS

Ericsson; "Enhancements on Multi-beam Operation"; 3GPP TSG-RAN WG1 Meeting #105-e, Tdoc R1-2105828; e-Meeting; May 10-27, 2021 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action issued in Japanese Patent Application No. 2023-537882, dated Aug. 12, 2025 (6 pages).

* cited by examiner

```
CSI-ReportConfig ::=                SEQUENCE {
    reportConfigId                          CSI-ReportConfigId,
    ……
    resourcesForChannelMeasurement          CSI-ResourceConfigId,
    csi-IM-ResourcesForInterference         CSI-ResourceConfigId            OPTIONAL,   -- Need R
    nzp-CSI-RS-ResourcesForInterference     CSI-ResourceConfigId            OPTIONAL,   -- Need R
    ……
    reportQuantity                          CHOICE {
        none                                    NULL,
        cri-RI-PMI-CQI                          NULL,
        cri-RI-i1                               NULL,
        cri-RI-i1-CQI                           SEQUENCE {
            pdsch-BundleSizeForCSI                  ENUMERATED {n2, n4}
OPTIONAL    -- Need S
        },
        cri-RI-CQI                              NULL,
        cri-RSRP                                NULL,
        ssb-Index-RSRP                          NULL,
        cri-RI-LI-PMI-CQI                       NULL
    },
    reportQuantity-r16                          CHOICE {
       cri-SINR-r16                                 NULL,
       ssb-Index-SINR-r16                           NULL
    }
                                               }
```

FIG. 1

| CSI report number | CSI fields |
| --- | --- |
| CSI report #n | CRI or SSBRI # 1 |
| | CRI or SSBRI # 2 |
| | CRI or SSBRI # 3 |
| | CRI or SSBRI # 4 |
| | RSRP/SINR #1 |
| | Differential RSRP/SINR #2 |
| | Differential RSRP/SINR #3 |
| | Differential RSRP/SINR#4 |

FIG. 2

| CSI report number | CSI fields |
|---|---|
| CSI report #n | CRI or SSBRI or SRI #1 |
| | CRI or SSBRI or SRI #2 |
| | CRI or SSBRI or SRI #3 |
| | CRI or SSBRI or SRI #4 |
| | Power/MPR related value #1 |
| | Power/MPR related value #2 |
| | Power/MPR related value #3 |
| | Power/MPR related value #4 |

FIG. 3

| CSI report number | CSI fields | |
|---|---|---|
| CSI report #n | Beam1 | BEAM INDEX |
| | Beam2 | |
| | DL RSRP/SINR of beam1 | DL BEAM QUALITY |
| | Differential DL RSRP/SINR of beam2 | |
| | Beam6 | BEAM INDEX |
| | Beam5 | |
| | UL RSRP/PHR of beam6 | UL BEAM QUALITY |
| | Differential UL RSRP/PHR of beam5 | |

FIG. 5

| CSI report number | CSI fields | |
| --- | --- | --- |
| CSI report #n | Beam1 | BEAM INDEX |
| | Beam2 | |
| | Beam6 | |
| | Beam5 | |
| | DL RSRP/SINR of beam1 | DL BEAM QUALITY |
| | Differential DL RSRP/SINR of beam2 | |
| | UL RSRP/PHR of beam6 | UL BEAM QUALITY |
| | Differential UL RSRP/PHR of beam5 | |

FIG. 6

| CSI report number | CSI fields | |
|---|---|---|
| CSI report #n | CRI or SSBRI or SRI #1 or TCI state#1, if reported | BEAM INDEX |
| | CRI or SSBRI or SRI #2 or TCI state#2, if reported | |
| | ... | |
| | CRI or SSBRI or SRI #N_all or TCI state#N_all, if reported | |
| | RSRP/SINR #1 | DL BEAM QUALITY |
| | Differential RSRP/SINR #2 | |
| | ... | |
| | Differential RSRP/SINR #N_all | |
| | UL RSRP/PHR #1, if reported | UL BEAM QUALITY |
| | UL RSRP/PHR #2, if reported | |
| | ... | |
| | UL RSRP/PHR #N_all, if reported | |

FIG. 7

| CSI report number | CSI fields |
| --- | --- |
| CSI report #n | CRI or SSBRI or SRI #1 or TCI state#1, if reported |
| | CRI or SSBRI or SRI #2 or TCI state#2, if reported |
| | ... |
| | CRI or SSBRI or SRI #N_all or TCI state#N_all, if reported |
| | UL RSRP/PHR #1, if reported |
| | UL RSRP/PHR #2, if reported |
| | ... |
| | UL RSRP/PHR #N_all, if reported |
| | RSRP/SINR #1 |
| | Differential RSRP/SINR #2 |
| | ... |
| | Differential RSRP/SINR #N_all |

BEAM INDEX

UL BEAM QUALITY

DL BEAM QUALITY

FIG. 8

| CSI report number | CSI fields | |
|---|---|---|
| CSI report #n | CRI or SSBRI or SRI #1 or TCI state#1, if reported | BEAM INDEX |
| | CRI or SSBRI or SRI #2 or TCI state#2, if reported | |
| | ... | |
| | CRI or SSBRI or SRI #N_all or TCI state#N_all, if reported | |
| | UL RSRP/PHR #1, if reported | UL BEAM QUALITY |
| | Differential UL RSRP/PHR #2, if reported | |
| | ... | |
| | Differential UL RSRP/PHR #N_all, if reported | |
| | RSRP/SINR #1 | DL BEAM QUALITY |
| | RSRP/SINR #2 | |
| | ... | |
| | RSRP/SINR #N_all | |

FIG. 9

| CSI report number | CSI fields | |
|---|---|---|
| CSI report #n | CRI or SSBRI or SRI #1 or TCI state#1, if reported | BEAM INDEX |
| | CRI or SSBRI or SRI #2 or TCI state#2, if reported | |
| | ... | |
| | CRI or SSBRI or SRI #N_all or TCI state#N_all, if reported | |
| | RSRP/SINR #1 | DL BEAM QUALITY |
| | RSRP/SINR #2 | |
| | ... | |
| | RSRP/SINR #N_all | |
| | UL RSRP/PHR #1, if reported | UL BEAM QUALITY |
| | Differential UL RSRP/PHR #2, if reported | |
| | ... | |
| | Differential UL RSRP/PHR #N_all, if reported | |

FIG. 10

| CSI report number | CSI fields |
|---|---|
| CSI report #n | CRI or SSBRI or SRI #1 or TCI state#1, if reported |
| | CRI or SSBRI or SRI #2 or TCI state#2, if reported |
| | ... |
| | CRI or SSBRI or SRI #N_all or TCI state#N_all, if reported |
| | An indication of strongest UL RSRP/PHR if reported |
| | RSRP/SINR #1 |
| | Differential RSRP/SINR #2 |
| | ... |
| | Differential RSRP/SINR #N_all |
| | Differential UL RSRP/PHR #1, if reported |
| | UL RSRP/PHR #2, if reported |
| | ... |
| | Differential UL RSRP/PHR #N_all, if reported |

BEAM INDEX
INFORMATION INDICATING BEST UL BEAM
DL BEAM QUALITY
UL BEAM QUALITY

FIG. 11

| CSI report number | CSI fields | |
|---|---|---|
| CSI report #n | CRI or SSBRI or SRI #1 or TCI state#1, if reported | BEAM INDEX |
| | CRI or SSBRI or SRI #2 or TCI state#2, if reported | |
| | ... | |
| | CRI or SSBRI or SRI #N_all or TCI state#N_all, if reported | |
| | An indication of strongest DL RSRP/SINR beam, if reported | INFORMATION INDICATING BEST DL BEAM |
| | Differential RSRP/SINR #1 | DL BEAM QUALITY |
| | Differential RSRP/SINR #2 | |
| | ... | |
| | RSRP/SINR #N_all | |
| | UL RSRP/PHR #1, if reported | UL BEAM QUALITY |
| | Differential UL RSRP/PHR #2, if reported | |
| | ... | |
| | Differential UL RSRP/PHR #N_all, if reported | |

FIG. 12

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In a radio communication system, a UE measures a channel state by using a certain reference signal (or resources for the reference signal), and feeds back (reports) channel state information (CSI) to the base station. A report of CSI corresponds to a beam report (beam).

However, when the beam report (CSI report) includes at least one of a UL beam report and a DL beam report, how to perform the beam report has not been clarified. Unless the report related to a beam is appropriately performed, system performance, such as throughput, may be deteriorated.

In view of this, the present disclosure has one object to provide a terminal, a radio communication method, and a base station that can appropriately execute a report (CSI report) related to a beam.

Solution to Problem

A terminal according to one aspect of the present disclosure includes a control section that selects a beam to be reported, based on at least one of an uplink (UL) beam quality and a downlink (DL) beam quality, and a transmitting section that transmits a beam report including at least one of the UL beam quality and the DL beam quality of the selected beam.

Advantageous Effects of Invention

According to one aspect of the present disclosure, a report (CSI report) related to a beam can be appropriately executed.

BRIEF DESCRIPTION OF DRAWINGS

FIG. 1 is a diagram to show a CSI report configuration in Rel. 16.

FIG. 2 is a diagram to show a DL beam report of a CSI report in Rel. 16.

FIG. 3 is a diagram to show an example of the CSI report including a UL beam report.

FIG. 5 is a diagram to show a first example of a beam report according to a second embodiment.

FIG. 6 is a diagram to show a second example of the beam report according to the second embodiment.

FIG. 7 is a diagram to show an example of the CSI report in Option 3-2-1-1.

FIG. 8 is a diagram to show an example of the CSI report in Option 3-2-1-2.

FIG. 9 is a diagram to show an example of the CSI report in Option 3-2-1-3.

FIG. 10 is a diagram to show an example of the CSI report in Option 3-2-1-4.

FIG. 11 is a diagram to show an example of the CSI report in Option 3-2-2-1.

FIG. 12 is a diagram to show an example of the CSI report in Option 3-2-2-2.

DESCRIPTION OF EMBODIMENTS (MPE)

Figure 4:
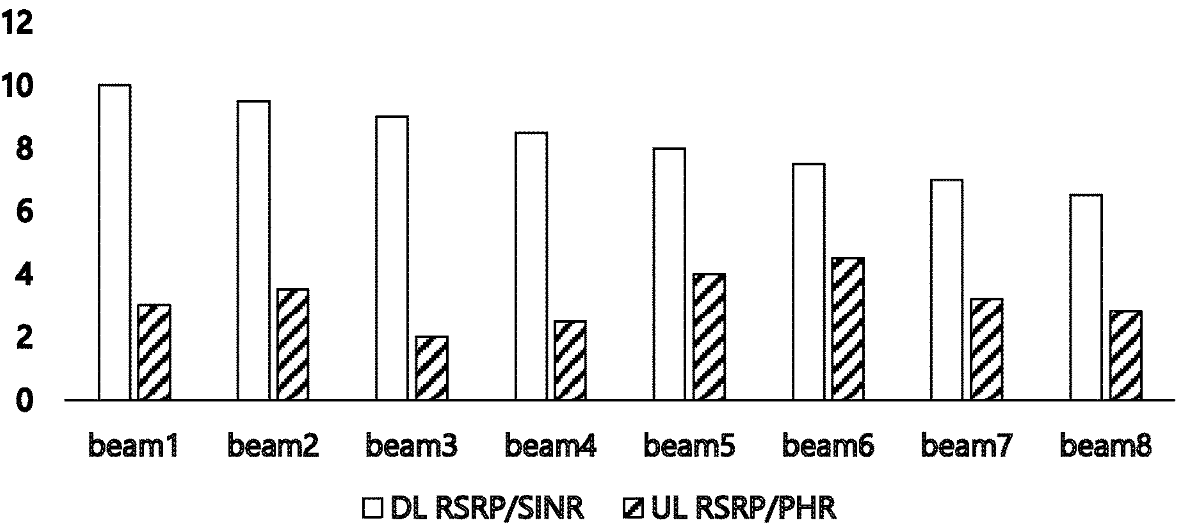
FIG. 4 is a diagram to show an example of DL and UL beam qualities.

In NR, measures against a problem of maximum permitted exposure (MPE) (or electromagnetic power density exposure) have been under study. A UE is required to satisfy regulations of Federal Communication Commission (FCC) related to maximum radiation to human bodies for the sake of health and safety. For example, in Rel-15 NR, the following two limitation methods are defined as definition for limiting exposure (explosure).

<Limitation Method 1>

As limitation method 1, limitation using power-management maximum power reduction (P-MPR, maximum permitted UE output power reduction) is defined. For example, UE maximum output power $P_{CMAX,f,c}$ is configured so that corresponding $P_{UMAX,f,c}$ (measured maximum output power, measured maximum configured UE output power) satisfies the following expression (1).

$$P_{Powerclass} - \text{MAX}(\text{MAX}(MPR_{f,c}, A\text{-}MPR_{f,c}) + \Delta MB_{P,n}, P\text{-}MPR_{f,c}) - \text{MAX}\{T(\text{MAX}(MPR_{f,c}, A\text{-}MPR_{f,c})), T(P\text{-}MPR_{f,c})\} \le P_{UMAX,f,c} \le EIRP_{max} \quad (1)$$

$EIRP_{max}$ is a maximum value of corresponding measurement peak equivalent isotopically radiated power (EIRP). $P\text{-}MPR_{f,c}$ is a value indicating reduction of maximum output power permitted for a carrier f of a serving cell c. $P\text{-}MPR_{f,c}$ is introduced into the expression of the UE maximum output power $P_{CMAX,f,c}$ configured for the carrier f of the serving cell c. With this, the UE can report its available maximum output transmission power to a base station (for example, a gNB). The report can be used by the base station for determination of scheduling. $P\text{-}MPR_{f,c}$ may be used for ensuring compliance with available electromagnetic energy absorption requirements and addressing unnecessary radiation/self-defense requirements in a case of simultaneous transmission in a plurality of RATs for a scenario not within a scope of use of 3GPP RAN, or may be used for ensuring compliance with available electromagnetic energy absorption requirements in a case where proximity detection is used for addressing such requirements that require lower maximum output power.

<Limitation Method 2>

In 3GPP Rel-15 NR, in order to satisfy guidelines of protection of human bodies against millimeter waves, UE capability information of reporting an uplink transmission rate at which the UE can perform transmission without requiring application of P-MPR has been introduced. The capability information may be referred to as a maximum uplink duty cycle (maxUplinkDutyCycle-FR2) in Frequency Range 2 (FR2).

maxUplinkDutyCycle-FR2 corresponds to a higher layer parameter. maxUplinkDutyCycle-FR2 may be an upper limit of a UL transmission ratio within a certain evaluation period (for example, one second). In Rel-15 NR, the value is one of n15, n20, n25, n30, n40, n50, n60, n70, n80, n90, and n100, which correspond to 158, 208, 258, 30%, 40%, 50%, 60%, 70%, 80%, 90%, and 100%, respectively. maxUplinkDutyCycle-FR2 may be applied to all of the UE power classes in FR2. Note that a default value need not be defined for maxUplinkDutyCycle-FR2.

When a field of maxUplinkDutyCycle-FR2 is present as the UE capability information, and the ratio of UL (Uplink) symbols transmitted within an evaluation period of one second is higher than maxUplinkDutyCycle-FR2, the UE may apply the limitation (limitation method 1) using P-MPR in accordance with UL scheduling. Otherwise, the UE need not apply P-MPR.

When the field of maxUplinkDutyCycle-FR2 is not present as the UE capability information, conformity with electromagnetic power density exposure requirements (MPE requirements) may be ensured, using reduction of power density or other scheme.

<MPE Report>

In order to achieve high-speed selection of a UL panel, prompting UL transmit beam selection for the UE including a plurality of panels (multi-panel) based on a UL beam indication has been under study, with UL coverage loss due to MPE being taken into consideration. In view of this, it is considered that the UE reports a report related to maximum permitted exposure (MPE) on an uplink transmit beam, using a MAC CE or the like.

For example, the UE may perform the report related to MPE together with PH in a single entry or double entry Power Headroom Report (PHR) MAC CE. For example, the PHR MAC CE may include a specific field ("P" field). When an FR2 MPE report (mpe-Reporting-FR2) is configured and the serving cell operates in FR2, and an applied P-MPR value is less than a specific P-MPR value (P-MPR_00) in order to satisfy the MPE requirements, 1 is configured to the field. When the FR2 MPE report is not configured, or the serving cell operates in FR1, the specific field may indicate whether power backoff is applied due to power management.

The PHR MAC CE may include a field ("MPE") indicating MPE (P-MPR). When the FR2 MPE report is configured, the serving cell operates in FR2, and 1 is configured to the specific field ("P" field), the field indicating MPE may indicate power backoff, which is applied in order to satisfy the MPE requirements. The field indicating MPE may indicate an index corresponding to a measured P-MPR value (for example, in the unit of dB). When the FR2 MPE report is not configured, the serving cell operates in FR1, or 0 is configured to the specific field, R bits may be present instead of the field indicating MPE.

The double entry PHR MAC CE may include a serving cell index, and include the specific field and the field indicating MPE corresponding to each serving cell.

(CSI Report)

In NR, a UE measures a channel state by using a certain reference signal (or resources for the reference signal), and feeds back (reports) channel state information (CSI) to the base station.

The UE may measure the channel state by using a channel state information reference signal (CSI-RS), a synchronization signal/broadcast channel (Synchronization Signal/Physical Broadcast Channel (SS/PBCH)) block, a synchronization signal (SS), a demodulation reference signal (DMRS), or the like.

A CSI-RS resource may include at least one of a non zero power (NZP) CSI-RS and CSI-Interference Management (IM). The SS/PBCH block is a block including a synchronization signal (for example, a primary synchronization signal (PSS) or a secondary synchronization signal (SSS)) and a PBCH (and its corresponding DMRS), and may be referred to as an SS block (SSB) or the like. An SSB index may be given to a time position of the SSB in a half frame.

Note that the CSI may include at least one of a channel quality indicator (CQI), a precoding matrix indicator (PMI), a CSI-RS resource indicator (CRI), an SS/PBCH block resource indicator (SSBRI), a layer indicator (L1), a rank indicator (RI), Layer 1 (L1)—Reference Signal Received Power (RSRP) (reference signal received power in layer 1), L1-Reference Signal Received Quality (RSRQ), an L1-Signal to Interference plus Noise Ratio (SINR), an L1-Signal to Noise Ratio (SNR), and the like.

The CSI may include a plurality of parts. The first part of the CSI (CSI part 1) may include information (for example, the RI) having relatively a small number of bits. The second part of the CSI (CSI part 2) may include information (for example, the CQI) having relatively a large number of bits, such as information determined based on CSI part 1.

As a feedback method of the CSI, (1) a periodic CSI (P-CSI) report, (2) an aperiodic CSI (A (AP)-CSI) report, (3) a semi-persistent CSI report (Semi-Persistent CSI (SP-CSI)) report, and the like have been under study.

The UE may be notified of information (which may be referred to as CSI report configuration information) related to the CSI report, using higher layer signaling, physical layer signaling (for example, downlink control information (DCI)), or a combination of these. The CSI report configuration information may be, for example, configured using an RRC information element "CSI-ReportConfig".

The CSI report configuration information may include, for example, information related to a report period, an offset, or the like, and these may be expressed in the unit of certain time (the unit of a slot, the unit of a subframe, the unit of a symbol, or the like). The CSI report configuration information may include a configuration ID (CSI-ReportConfigId). With the configuration ID, parameters such as a type of a CSI report method (whether or not the SP-CSI is used or the like) and a report period may be identified. The CSI report configuration information may include information (CSI-ResourceConfigId) indicating which CSI measured by using which signal (or resources for which signal) is to be reported.

<CSI Report Configuration/CSI Report (DL Beam Report)>

FIG. 1 is a diagram to show a CSI report configuration in Rel. 16. "resourcesForChannelMeasurement" is a parameter related to channel measurement. "cri-RSRP" and "ssb-Index-RSRP" are each a parameter related to beam management. When "cri-RSRP" is configured, the UE reports a CRI and L1-RSRP corresponding to the CRI. When "ssb-Index-RSRP" is configured, the UE reports an SSBRI and L1-RSRP corresponding to the SSBRI.

"reportQuantity-r16" configures L1-SINR-based DL beam report quantity. "reportQuantity-r16" includes "cri-SINR-r16" and "ssb-Index-SINR-r16". "cri-SINR-r16" and "ssb-Index-SINR-r16" are each a parameter related to beam management. When "cri-SINR-r16" is configured, the UE reports a CRI and L1-SINR corresponding to the CRI. When "ssb-Index-SINR-r16" is configured, the UE reports an SSBRI and L1-SINR corresponding to the SSBRI. When "reportQuantity-r16" is present, "reportQuantity" may be ignored.

In other words, report configuration of the L1-RSRP/L1-SINR related to a DL beam is included in the CSI report configuration.

FIG. 2 is a diagram to show a DL beam report of the CSI report in Rel. 16. "CRI or SSBRI #1", "CRI or SSBRI #2", "CRI or SSBRI #3", and "CRI or SSBRI #4" illustrated in FIG. 2 each indicate a DL beam index. The DL beam indexes may be ordered according to strength of the RSRP/SINR, and the RSRP/SINR corresponding to a first (optimal) DL beam index may be "RSRP/SINR #1", each of which may be a value quantized to 7 bits. "Differential RSRP/SINR #2", "Differential RSRP/SINR #3", and "Differential RSRP/SINR #4" may each be a differential value with respect to "RSRP/SINR #1", and may be a value quantized to 4 bits.

<UL Beam Report in CSI Report>

The UE may transmit a beam index (for example, an SSB/CSI-RS/sounding reference signal (SRS) RI), a UL panel index, and a value (UL RSRP or PHR) related to power/MPR as the CSI report.

In the CSI report configuration, a UL beam report configuration and a DL beam report configuration may be separate (UL and DL separate beam measurement/report configuration). For example, the UE may receive a first information element including the UL beam report configuration and a second CSI information element including the DL beam report configuration, which is different from the first information element, using higher layer signaling.

The UE may receive the DL beam report configuration together with the UL beam report configuration (UL and DL joint beam measurement/report configuration). For example, the UE may receive one information element including both of the UL beam report configuration and the DL beam report configuration, using higher layer signaling.

The UL beam report may be supported in addition to the DL beam report (for example, L1-RSRP or L1-SINR). In other words, the UL beam report may be configured only when the DL beam report is configured.

The UL beam report in the CSI report will be described. The CSI report may first include a field of a UL beam index, and then include a field of a value related to transmission power/MPR of a UL beam. The value related to transmission power/MPR of the UL beam may be an absolute quantized value, or may be a differential value with respect to a value related to transmission power/MPR of an optimal UL beam.

FIG. 3 is a diagram to show an example of the CSI report including the UL beam report. "CRI or SSBRI or SRI #1", "CRI or SSBRI or SRI #2", "CRI or SSBRI or SRI #3", and "CRI or SSBRI or SRI #4" illustrated in FIG. 3 each indicate a UL beam index. "POWER/MPR Related value #1", "POWER/MPR Related value #2", "POWER/MPR Related value #3", and "POWER/MPR Related value #4" are each a value related to transmission power/MPR of a UL beam corresponding to each UL beam index. The notation of FIG. 3 is an example, and another notation having similar meanings may be used. The UL beam indexes may be ordered according to strength of the RSRP/SINR, and a value related to transmission power/MPR corresponding to a first (optimal) UL beam index may be reported first (at the start). Such values related to transmission power/MPR may all be absolute values, or similarly to the DL beam report, only a first value may be an absolute value and the following values may be differential values.

The UE may report a beam index, and estimated remaining power taking account of P-MPR for each beam indicated by the beam index. The estimated remaining power for each beam may be a power headroom value (PH value), based on actual transmission or a reference format (virtual transmission) taking account of MPE. Alternatively, the estimated remaining power for each beam may be a PH report (PHR) (for example, a PH type, a PH value, or $P_{CMAX,f,c}$ with contents similar to the PHR MAC CE) taking account of MPE (P-MPR value) for each beam. The PHR may take TPC/PL-RS for each beam into account.

However, when the beam report (CSI report) includes at least one of the UL beam report and the DL beam report, how to perform the beam report has not been clarified. For example, the number of beams to be selected (reported), a selection procedure, reporting order (mapping order), and the like have not been clarified. Unless the report related to a beam is appropriately performed, system performance, such as throughput, may be deteriorated.

In view of this, the inventors of the present invention came up with the idea of a terminal including a control section that selects a beam to be reported, based on at least one of an uplink (UL) beam quality and a downlink (DL) beam quality, and a transmitting section that transmits the UL beam quality and the DL beam quality of the selected beam as a beam report.

Embodiments according to the present disclosure will be described in detail with reference to the drawings as follows. The radio communication methods according to respective embodiments may each be employed individually, or may be employed in combination.

In the present disclosure, "A/B/C" and "at least one of A, B, and C" may be interchangeably interpreted. In the present disclosure, a cell, a CC, a carrier, a BWP, a DL BWP, a UL BWP, an active DL BWP, an active UL BWP, and a band may be interchangeably interpreted. In the present disclosure, an index, an ID, an indicator, a resource ID, and an RI (a resource indicator or a rank indicator) may be interchangeably interpreted. In the present disclosure, to support, to control, to be able to control, to operate, and to be able to operate may be interchangeably interpreted.

In the present disclosure, configure, activate, update, indicate, enable, specify, and select may be interchangeably interpreted.

In the present disclosure, a MAC CE and an activation/deactivation command may be interchangeably interpreted.

In the present disclosure, higher layer signaling may be, for example, any one of Radio Resource Control (RRC) signaling, Medium Access Control (MAC) signaling, broadcast information (a master information block (MIB), a system information block (SIB), or the like), and the like, or a combination of these. In the present disclosure, RRC, RRC signaling, an RRC parameter, a higher layer, a higher layer parameter, an RRC information element (IE), and an RRC message may be interchangeably interpreted. The report in the present disclosure may be performed using higher layer signaling. "Report", "measure", and "transmit" in the present disclosure may be interchangeably interpreted.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

In the present disclosure, a beam, a panel, a spatial domain filter, a space setting, a TCI state, a TCI state pool, a plurality of TCI states, a UL TCI state, a unified TCI state, a unified beam, a common TCI state, a common beam, a QCL assumption, a QCL parameter, a spatial domain reception filter, a UE spatial domain reception filter, a UE receive beam, a DL beam, a DL receive beam, DL precoding, a DL precoder, a DL-RS, an RS of QCL type D of the TCI state/QCL assumption, an RS of QCL type A of the TCI state/QCL assumption, a spatial relation, a spatial domain transmission filter, a UE spatial domain transmission filter, a UE transmit beam, a UL beam, a UL transmit beam, UL precoding, a UL precoder, and a PL-RS may be interchangeably interpreted. In the present disclosure, a QCL type X-RS, a DL-RS associated with QCL type X, a DL-RS including QCL type X, a source of the DL-RS, an SSB, a CSI-RS, and an SRS may be interchangeably interpreted.

The beam index may be an SSB index, an SSBRI, a CSI-RS, a CRI, an SRS index, or an SRI. The panel index may be an antenna group index/antenna set index, an RS group index/RS set index, or another equivalent index. The beam report transmitted by the UE may support both of non-group and group-based reports.

In the present disclosure, MPE, MPR, and P-MPR may be interchangeably interpreted. The CSI report and the beam report may be interchangeably interpreted. The RSRP and the SINR may be interchangeably interpreted.

The DL beam report in the present disclosure may include at least one of a DL beam index, L1-RSRP, and L1-SINR. The UL beam report may include at least one of a UL beam index, transmission power of a UL beam, a value related to MPR, and PH (PHR) taking account of MPE.

In the present disclosure, to select a beam may mean to select a beam (beam index/beam quality) included in a beam report (CSI report). In the present disclosure, to map (or select) report contents (beam index, beam quality, and the like) to a beam report based on a UL beam quality/DL beam quality may mean to map (or select) report contents to a beam report in order from a high UL beam quality/DL beam quality (RSRP/SINR/PHR having a large numerical value, a small MPR value). Note that calculation of UL RSRP will be described later. The PHR may be a PHR taking account of MPE. Best, maximum (highest), and strongest may be interchangeably interpreted. A beam index, a DL beam index, and a UL beam index may be interchangeably interpreted.

(Radio Communication Method)

First Embodiment

In the UL beam report (for example, the UL RSRP for each beam, the PHR (UL PHR) for each beam, or a strength value of another UL channel for each beam), the UE may select N_U UL beams to be reported, based on the UL beam qualities/DL beam qualities. The UE transmits the beam report including qualities of the selected UL beams. In the present disclosure, the beam report and the CSI report may be interchangeably interpreted.

In the following, N_U may indicate the number of UL beams to be selected/reported. A beam selection rule in the present disclosure may be defined in a specification, or may be applied only when specific configuration is performed with an RRC parameter or the like. As a UL beam selection rule, for example, one of the following Options 1-0 to 1-3 is applied. The PHR in the present disclosure may be a PHR (UL PHR) taking account of MPE.

In the present disclosure, UL RSRP (RSRP of UL) may be calculated as $P_{UEtx}-PL=P_{UEtx}-(DL\ P_{BS}-DL\ RSRP)$. $P_{UEtx}$ is transmission power of the UE, and may be determined using P-MPR based on UL high-speed transmission power control (TPC) and MPE. PL is path loss, and DL Pes is DL transmission power in the base station.

In the present disclosure, the UL beam quality to be reported may be at least one of RSRP, PHR, and MPE (MPR) of the UL (UL beam). The DL beam quality to be reported may be at least one of RSRP and SINR of the DL (DL beam).

[Option 1-0]

The UE may select N_U beams to be reported, based on the UL beam qualities.

[Option 1-1]

Based on the DL beam qualities, N_U beams to be reported may be selected, and the UL beam qualities of the selected beams may be transmitted. The UE may map the selected beams to the beam report, based on order of the UL beam qualities (for example, the RSRP/PHR/MPR). Alternatively, the UE may map UL beams to the beam report, based on order of the UL beam qualities.

[Option 1-2]

Based on the DL beam qualities, first M UL beams may be acquired (selected). M may be configured using higher layer signaling (for example, RRC) or the like, or may be defined in a specification. The UE may select a maximum of M UL beams, based on a comparison between a threshold configured using higher layer signaling or the like or defined in a specification and a value (for example, an RSRP value) related to each DL beam quality.

Then, the UE may select N_U UL beams out of the M beams, based on the UL beam qualities. For example, the UE may map UL beams, out of the M beams, to the beam report, based on order of the UL beam qualities (for example, the RSRP/PHR/MPR). Alternatively, the UE may map UL beams to the beam report, based on order of the DL beam qualities.

[Option 1-3]

The UE may acquire (select) first M UL beams, based on the UL beam qualities. M may be configured using higher layer signaling (for example, RRC) or the like, or may be defined in a specification. The UE may select a maximum of M UL beams, based on a comparison between a threshold configured using higher layer signaling or the like or defined in a specification and each UL beam quality (for example, the RSRP/SINR/PHR/MPR).

Then, the UE may select N_U UL beams out of the M beams, based on the DL beam qualities. The UE may map UL beams to the beam report, based on order of the DL beam qualities (for example, the RSRP/SINR). Alternatively, the UE may map UL beams to the beam report, based on order of the UL beam qualities.

Contents of the UL beam report may include at least one of the contents in <UL Beam Report in CSI Report> described above. The UL beam index/UL beam quality to be reported may correspond to the UL beam selected based on one of the options described above.

When a specific condition is satisfied, the UE may apply one of the options. For example, when the UL RSRP, the PHR, or the MPR corresponding to all of the beams exceeds a corresponding threshold, or the number of beams exceeding the threshold is equal to or more than a certain value, the UE may apply Option 1-3, otherwise the UE may apply Option 1-0/1-1/1-2.

Alternatively, the UE may select UL beams, based on calculation results (for example, a total value/average value, or the like) using a value related to the DL beam quality and a value related to the UL beam quality.

[Specific Example]

FIG. 4 is a diagram to show an example of DL and UL beam qualities. FIG. 4 shows, as the beam quality, a graph of DL beam qualities (DL RSRPs/SINRs) and UL beam qualities (UL RSRPs/PHRs) corresponding thereto. In the specific example, N_U is 4. In the specific example of the present disclosure, the DL RSRP/SINR is used as the DL beam quality and the UL RSRP/PHR is used as the UL beam quality; however, another example may be used.

When Option 1-1 is applied, the UE selects beam 1/2/3/4 based on the DL RSRP/SINR, and maps the beams to the beam report in order of beams 2, 1, 4, and 3 based on the UL RSRP/PHR.

When Option 1-2 is applied, the UE selects beam 1/2/3/4/5/6 (M=6) based on the DL RSRP/SINR, selects beam 6/5/2/1 out of the beams based on the UL RSRP/PHR, and maps the beams to the beam report in order of beams 6, 5, 2, and 1.

When Option 1-3 is applied, the UE may select beam 6/5/2/7/1/8 (M=6) based on the UL RSRP/PHR, select beam 1/2/5/6 out of the beams based on the DL RSRP/SINR, and map the beams to the beam report in order of beams 1, 2, 5, and 6.

According to the present disclosure, UL beam selection taking account of not only the UL beam qualities but also the DL beam qualities can be performed, and therefore appropriate beams can be selected.

Second Embodiment

When the beam report includes both of the DL beam report (for example, the DL RSRP/SINR) and the UL beam report (for example, the UL RSRP/PHR/MPR) (joint beam report), the UE may receive a configuration of each of the number (N_D) of DL beam reports and the number (N_U) of UL beam reports. For N_D and N_U, common numbers or different numbers may be configured. The UE may transmit the beam report including (N_D) DL beam qualities according to the number of DL beam reports in the configuration and (N_U) UL beam qualities according to the number of UL beam reports in the configuration.

[Beam Selection Rule]

The UE may individually select DL beams and UL beams to be reported. For example, the UE may select DL beams based on the DL beam qualities (for example, the DL RSRP/SINR), and select UL beams based on the UL beam qualities (for example, the RSRP/PHR/MPR). The UE may select one or a plurality of (N_D) DL beams in order from a DL beam whose corresponding DL beam quality is high, and select one or a plurality of (N_U) UL beams in order from a UL beam whose corresponding UL beam quality is high. The method described in the first embodiment may be applied to the beam selection rule.

[Beam Report Contents]

[Option 2-1-1]

The beam report includes a value (for example, RSRP/SINR) related to the DL beam index and the DL beam quality for each of N_D DL beams. The beam report further includes a value (for example, RSRP/PHR/MPR) related to the UL beam index and the UL beam quality for each of N_U UL beams.

[Option 2-1-2]

The beam report includes the beam index, the value (for example, RSRP/SINR) related to the DL beam quality, and the value (for example, RSRP/PHR/MPR) related to the UL beam quality for each of (N_D+N_U) beams.

[Mapping Order in CSI Field and Quantization]

[Option 2-2-1]

In the beam report, mapping is performed in order of N_D DL beam indexes, values related to N_D DL beam qualities, N_U UL beam indexes, and values related to N_U UL beam qualities. Mapping order of the DL beam indexes and the values related to the DL beam qualities conforms to order of the DL beam qualities. Mapping order of the UL beam indexes and the values related to the UL beam qualities conforms to the UL beam qualities. Option 2-1-1 is applied to beam selection.

A value related to a first DL beam quality is a value related to the highest DL beam quality, and is quantized in a larger bit size (for example, 7 bits). Values related to the rest of the DL beam qualities may each be a differential value with respect to the value related to the highest DL beam quality, and are each quantized in a smaller bit size (for example, 4 bits). A value related to a first UL beam quality is a value related to the highest UL beam quality, and is quantized in a larger bit size (for example, 7 bits). Values related to the rest of the UL beam qualities may each be a differential value with respect to the value of the highest UL beam quality, and are each quantized in a smaller bit size (for example, 4 bits).

[Option 2-2-2]

Mapping is performed in order of N_D DL beam indexes, N_U UL beam indexes, values related to N_D DL beam qualities, and values related to N_U UL beam qualities. Order of the DL beam indexes and the values related to the DL beam qualities conforms to the DL beam qualities. Order of the UL beam indexes and the values related to the UL beam qualities conforms to the UL beam qualities. Mapping of the maximum (highest) values/differential values, quantization, the number of bits, and the like are the same as those of Option 2-2-1. Option 2-1-1 is applied to beam selection.

[Option 2-2-3]

Mapping is performed in order of (N_D+N_U) beam indexes, values related to DL beam qualities, and values related to UL beam qualities. Option 2-1-2 is applied to beam selection.

[Specific Example]

FIG. 5 is a diagram to show a first example of the beam report according to the second embodiment. In the beam report of FIG. 5, N_D=2 and N_U=2, based on the assumption of the beam qualities of FIG. 4. The example of FIG. 5 conforms to Option 2-1-1 and Option 2-2-1.

The UE selects beam 1 and beam 2 having high DL beam qualities out of DL beams, and includes, in order from a high DL beam quality, beam 1, beam 2, the DL RSRP/SINR (absolute value) of beam 1, and the DL RSRP/SINR (differential value) of beam 2 in the beam report. The DL RSRP/SINR of beam 2 may be an absolute value.

The UE selects beam 6 and beam 5 having high UL beam qualities out of UL beams, and includes, in order from a high UL beam quality, beam 6, beam 5, the UL RSRP/SINR (absolute value) of beam 6, and the UL RSRP/SINR (differential value) of beam 5 in the beam report. The UL RSRP/SINR of beam 5 may be an absolute value.

The beam indexes (beams 1, 2, 5, and 6) may be represented as "CRI or SSBRI or SRI #X or TCI state #X" (X=1, 2, 5, 6), for example.

FIG. 6 is a diagram to show a second example of the beam report according to the second embodiment. In the beam report of FIG. 6, N_D=2 and N_U=2, based on the assumption of the beam qualities of FIG. 4. The example of FIG. 6 conforms to Option 2-1-1 and Option 2-2-2. In the example of FIG. 6, the contents included in the CSI report are the same as those of the example of FIG. 5, but mapping order is different. In FIG. 6, mapping is performed in order of beam indexes, values related to DL beam qualities, and values related to UL beam qualities.

According to the present embodiment, the UE can perform the UL beam report together with the DL beam report in the CSI report, and when N_D and N_U are individually configured, the UE can generate/transmit an appropriate beam report by taking account of the DL beam qualities and the UL beam qualities.

Third Embodiment

When the beam report includes both of the DL beam report (for example, the DL RSRP/SINR) and the UL beam report (for example, the UL RSRP/PHR/MPR) (joint beam report), the UE may receive a configuration of a total number (N_all) of the number (N_D) of DL beam reports and the number (N_U) of UL beam reports. The UE may transmit the beam report including the DL beam qualities and the UL beam qualities according to the total number. In this case, individual configurations of N_D and N_U need not be performed.

[Beam Selection Rule]

[Option 3-1-0]

The UE may select N_all beams to be reported, based on the UL beam qualities.

[Option 3-1-1]

The UE may select N_all beams to be reported, based on the DL beam qualities.

[Option 3-1-2]

The UE may acquire (select) first M beams, based on the DL beam qualities. M may be configured using higher layer signaling (for example, RRC) or the like, or may be defined in a specification. The UE may select a maximum of M beams, based on a comparison between a threshold configured using higher layer signaling or the like or defined in a specification and a value (for example, an RSRP value) related to each DL beam quality. Then, the UE may select first N_all beams out of the M beams, based on the UL beam qualities.

[Option 3-1-3]

The UE may acquire (select) first M beams, based on the UL beam qualities. M may be configured using higher layer signaling (for example, RRC) or the like, or may be defined in a specification. The UE may select a maximum of M beams, based on a comparison between a threshold configured using higher layer signaling or the like or defined in a specification and a value (for example, an RSRP/PHR/MPR value) related to each UL beam quality. Then, the UE may select first N_all beams out of the M beams, based on the DL beam qualities.

[CSI Report Contents, Mapping Order in CSI Field, and Quantization]

[Option 3-2-1]

The beam report may include N_all beam indexes, and values related to DL beam qualities and values related to UL beam qualities for each beam.

[Option 3-2-1-1]

In the beam report, mapping is performed in order of N_all beam indexes, values related to N_all DL beam qualities, and values related to N_all UL beam qualities. Order of the beam indexes, the values related to the DL beam qualities, and the values related to the UL beam qualities is based on the DL beam qualities.

A value related to a first DL beam quality is a value (for example, RSRP/SINR) related to the best DL beam quality, and is quantized in a larger bit size (for example, 7 bits). Values related to the rest of the DL beam qualities may each be a differential value with respect to the value of the best DL beam quality, and are each quantized in a smaller bit size (for example, 4 bits). Values related to the UL beam qualities may each be an absolute value using the same bit size. This is because its first value is not necessarily the largest.

[Option 3-2-1-2]

Based on Option 3-2-1-1, mapping may be performed, with the order of the values related to N_all DL beam qualities and the values related to N_all UL beam qualities being reversed. In other words, mapping may be performed in order of the N_all beam indexes, the values related to N_all UL beam qualities, and the values related to N_all DL beam qualities.

Based on Option 3-2-1-1, a beam report in which the values related to the DL beam qualities and the values related to the UL beam qualities are alternately mapped may be applied. For example, mapping may be performed in order of N_all beam indexes, a value related to a DL beam quality of a first beam, a value related to a UL beam quality of the first beam, a value related to a DL beam quality of a second beam, a value related to a UL beam quality of the second beam, and so on.

In Option 3-2-1-2, bit sizes in quantization, distinction of differential values/absolute values, and the like are the same as those of Option 3-2-1-1.

[Option 3-2-1-3]

In the beam report, mapping is performed in order of N_all beam indexes, values related to N_all UL beam qualities, and values related to N_all DL beam qualities.

Order of the beam indexes, the values related to the UL beam qualities, and the values related to the DL beam qualities conforms to the UL beam qualities.

A value related to a first UL beam quality is a value (for example, RSRP/PHR/MPR) related to the best UL beam quality, and is quantized in a larger bit size (for example, 7 bits). Values related to the rest of the UL beam qualities may each be a differential value with respect to the value of the best UL beam quality, and are each quantized in a smaller bit size (for example, 4 bits). Values related to the DL beam qualities may each be an absolute value using the same bit size. This is because its first value is not necessarily the largest.

[Option 3-2-1-4]

Based on Option 3-2-1-3, mapping may be performed, with the order of the values related to N_all DL beam qualities and the values related to N_all UL beam qualities being reversed. In other words, mapping may be performed in order of the N_all beam indexes, the values related to N_all DL beam qualities, and the values related to N_all UL beam qualities.

Based on Option 3-2-1-3, a beam report in which the values related to the UL beam qualities and the values related to the DL beam qualities are alternately mapped may be applied. For example, mapping may be performed in order of N_all beam indexes, a value related to a UL beam quality of a first beam, a value related to a DL beam quality of the first beam, a value related to a UL beam quality of a second beam, a value related to a DL beam quality of the second beam, and so on. In other words, the values related to the UL beam qualities and the values related to the DL beam qualities may be alternately mapped. Bit sizes in quantization, distinction of differential values/absolute values, and the like are the same as those of Option 3-2-1-3.

[Option 3-2-2]

The beam report may include N_all beam indexes, and values related to DL beam qualities and values related to UL beam qualities for each beam, and may further include information indicating a beam corresponding to the best DL beam quality or information indicating a beam corresponding to the strongest (highest) UL beam quality.

[Option 3-2-2-1]

Based on Option 3-2-1-1 and Option 3-2-1-2, the beam report may include information (for example, a beam index) indicating the best UL beam quality previous to or subsequent to the N_all beam indexes. A value related to the best UL beam quality may be quantized in a larger bit size (for example, 7 bits), and values related to the rest of the UL beam qualities may each be a differential value with respect to the value of the highest UL beam quality, and may be quantized in a smaller bit size (for example, 4 bits).

With this, when the beam indexes are in order of the DL beam qualities as in the case of Option 3-2-1-1 and Option 3-2-1-2, the beam having the best UL beam quality can be clearly indicated.

[Option 3-2-2-2]

Based on Option 3-2-1-3 and Option 3-2-1-4, the beam report may include information (for example, a beam index) indicating the best DL beam quality previous to or subsequent to the N_all beam indexes. A value related to the best DL beam quality may be quantized in a larger bit size (for example, 7 bits), and values related to the rest of the DL beam qualities may each be a differential value with respect to the value of the highest DL beam quality, and may be quantized in a smaller bit size (for example, 4 bits).

With this, when the beam indexes are in order of the UL beam qualities as in the case of Option 3-2-1-3 and Option 3-2-1-4, the beam having the best DL beam quality can be clearly indicated.

[Specific Example]

FIG. 7 is a diagram to show an example of the CSI report in Option 3-2-1-1. "CRI or SSBRI or SRI #X or TCI state #X" corresponds to a beam index. Note that, in the examples of FIG. 7 to FIG. 12, X=1 to N_all. The beam indexes are mapped in order of their corresponding DL beam qualities. "RSRP/SINR #X" corresponds to an absolute value of the best DL beam quality, and "Differential RSRP/SINR #X" corresponds to a differential value with respect to the DL beam quality. "UL RSRP/PHR #X" corresponds to a UL beam quality.

FIG. 8 is a diagram to show an example of the CSI report in Option 3-2-1-2. Order of the values related to the UL beam qualities and the values related to the DL beam qualities is reversed from that of FIG. 7, but the rest is the same.

FIG. 9 is a diagram to show an example of the CSI report in Option 3-2-1-3. Similarly to FIG. 7, "CRI or SSBRI or SRI #X or TCI state #X" corresponds to a beam index. The beam indexes are mapped in order of their corresponding UL beam qualities. "UL RSRP/PHR #X" corresponds to an absolute value of the best UL beam quality, and "Differential UL RSRP/PHR #X" corresponds to a differential value with respect to the UL beam quality. "RSRP/SINR #X" corresponds to a DL beam quality.

FIG. 10 is a diagram to show an example of the CSI report in Option 3-2-1-4. Order of the values related to the UL beam qualities and the values related to the DL beam qualities is reversed from that of FIG. 9, but the rest is the same.

FIG. 11 is a diagram to show an example of the CSI report in Option 3-2-2-1. Information "An indication of strongest UL RSRP/PHR" indicating the best UL beam quality is included subsequent to the N_all beam indexes. The information may be a beam index "CRI or SSBRI or SRI #2 or TCI state #2" corresponding to the best UL beam quality. In FIG. 11, the information corresponds to "UL RSRP/PHR #2". In FIG. 11, order of the values related to the DL beam qualities and the values related to the UL beam qualities may be reversed.

FIG. 12 is a diagram to show an example of the CSI report in Option 3-2-2-2. Information "An indication of strongest DL RSRP/SINR beam" indicating the best DL beam quality is included subsequent to the N_all beam indexes. The information may be a beam index "CRI or SSBRI or SRI #N_all or TCI state #N_all" corresponding to the best DL beam quality. In FIG. 12, the information corresponds to "RSRP/SINR #N_all". In FIG. 12, order of the values related to the DL beam qualities and the values related to the UL beam qualities may be reversed.

According to the present embodiment, the UE can perform the UL beam report together with the DL beam report in the CSI report, and also when the total number of N_D and N_U is configured, the UE can generate/transmit an appropriate beam report by taking account of the DL beam qualities and the UL beam qualities.

<Additional Notes>

In the present disclosure, the beam index may be an SSB/CSI-RS/SRS index/TCI state ID, for example. The beam index may be configured/reported together with another index (ID) such as a panel ID/RS group ID/antenna group ID, or need not be configured/reported together with such another index.

The UL PHR in the present disclosure may be calculated by taking account of the P-MPR value of MPE for each beam and taking account of the TPC/PL-RS for each beam, in addition to a similar method of calculating an actual PHR or a virtual PHR.

When the UL beam report (first embodiment) or the joint DL/UL beam report (second or third embodiment) is transmitted using a MAC CE instead of UCI, a beam selection rule similar to that of the examples of the present disclosure, a mapping order rule in the MAC CE, and a quantization rule of values related to measured DL/UL may be applied to the MAC CE.

The new beam report in the present disclosure may be applied to at least one of periodic/aperiodic/semi-persistent CSI configured by a NW and the UE triggered by MPE for each cell/panel/beam.

<UE Capability>

The UE may transmit (report) UE capability information indicating whether to support at least one of the processes in the present disclosure to a network (base station). The UE may receive information for indicating/configuring at least one of the processes in the present disclosure, using DCI/MAC CE/higher layer signaling (for example, RRC) or the like. The information may correspond to the UE capability information transmitted by the UE. The UE capability information may include at least one of the following (1) to (3), for example.

(1) Whether a DL beam quality is taken into account when a UL beam is selected in order to report an MPE problem.

(2) Whether to support both of a DL RSRP/SINR value and a UL RSRP/PHR value of a beam of a CSI report.

(3) A maximum number of N_D/D U/N_all in a CSI report.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 13:
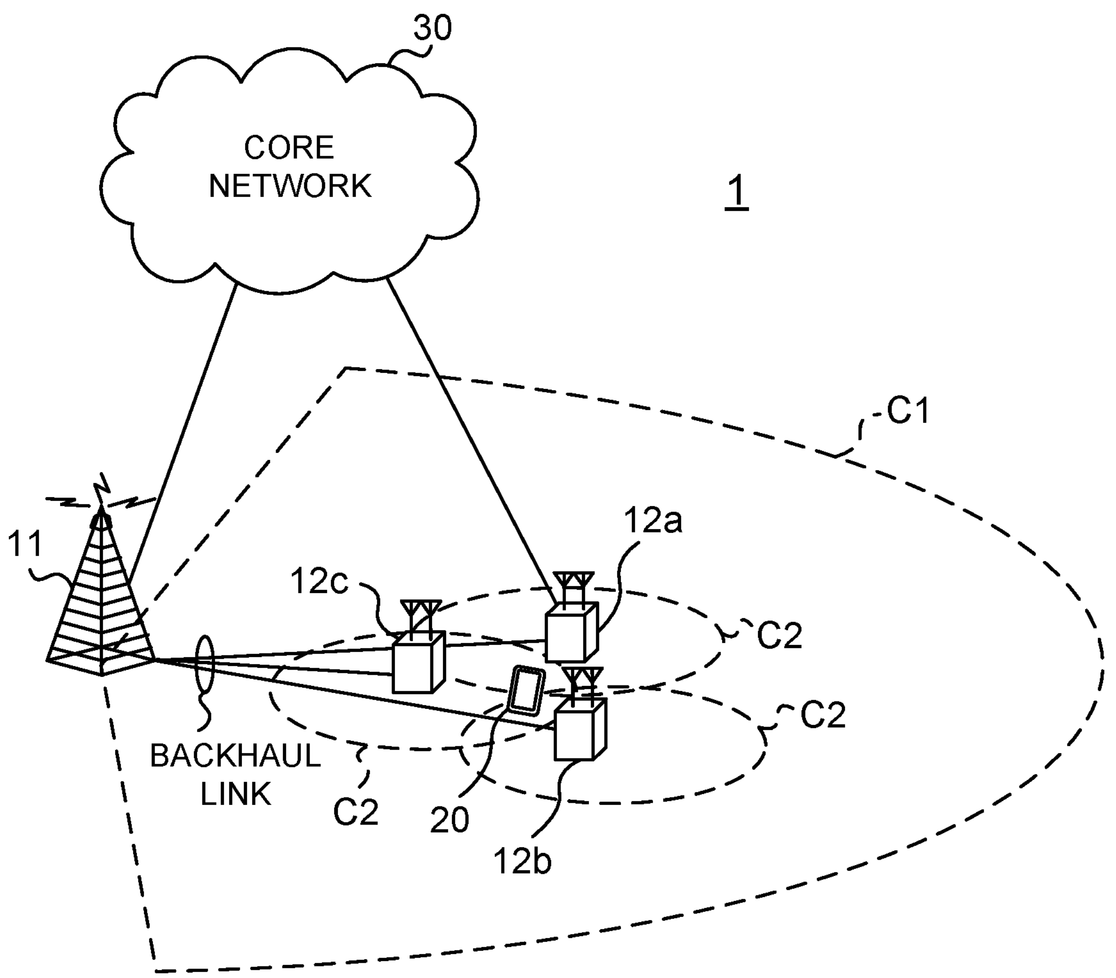
FIG. 13 is a diagram to show an example of a schematic structure of a radio communication system according to one embodiment.

FIG. 13 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12*a* to 12*c*) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHZ), and FR2 may be a frequency band which is higher than 24 GHZ (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 14:
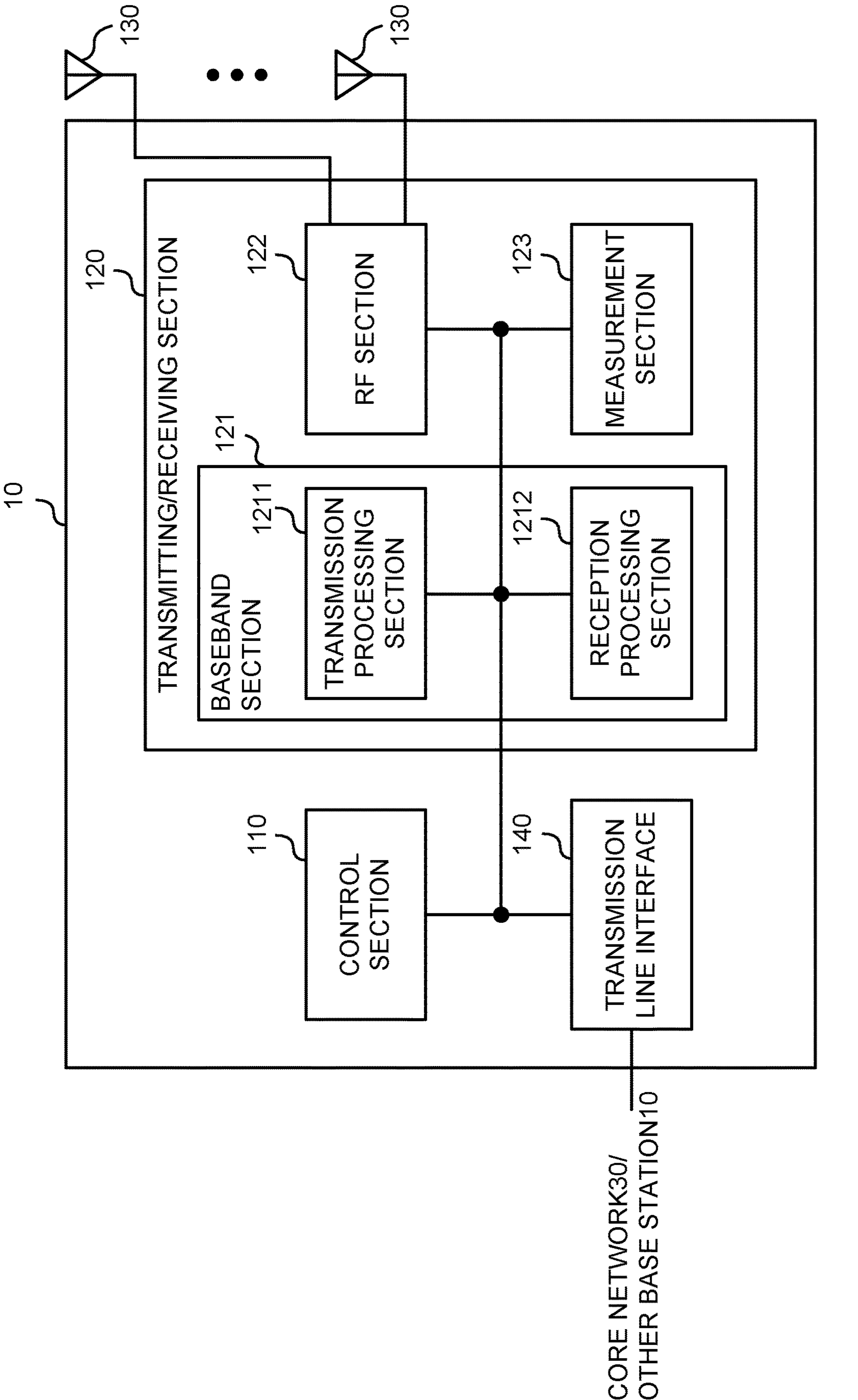
FIG. 14 is a diagram to show an example of a structure of a base station according to one embodiment.

FIG. 14 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The control section 110 may assume that a beam to be reported is selected by a terminal, based on at least one of an uplink (UL) beam quality and a downlink (DL) beam quality.

Note that the transmitting/receiving section 120 may receive a beam report including at least one of the UL beam quality and the DL beam quality of the selected beam.

(User Terminal)

Figure 15:
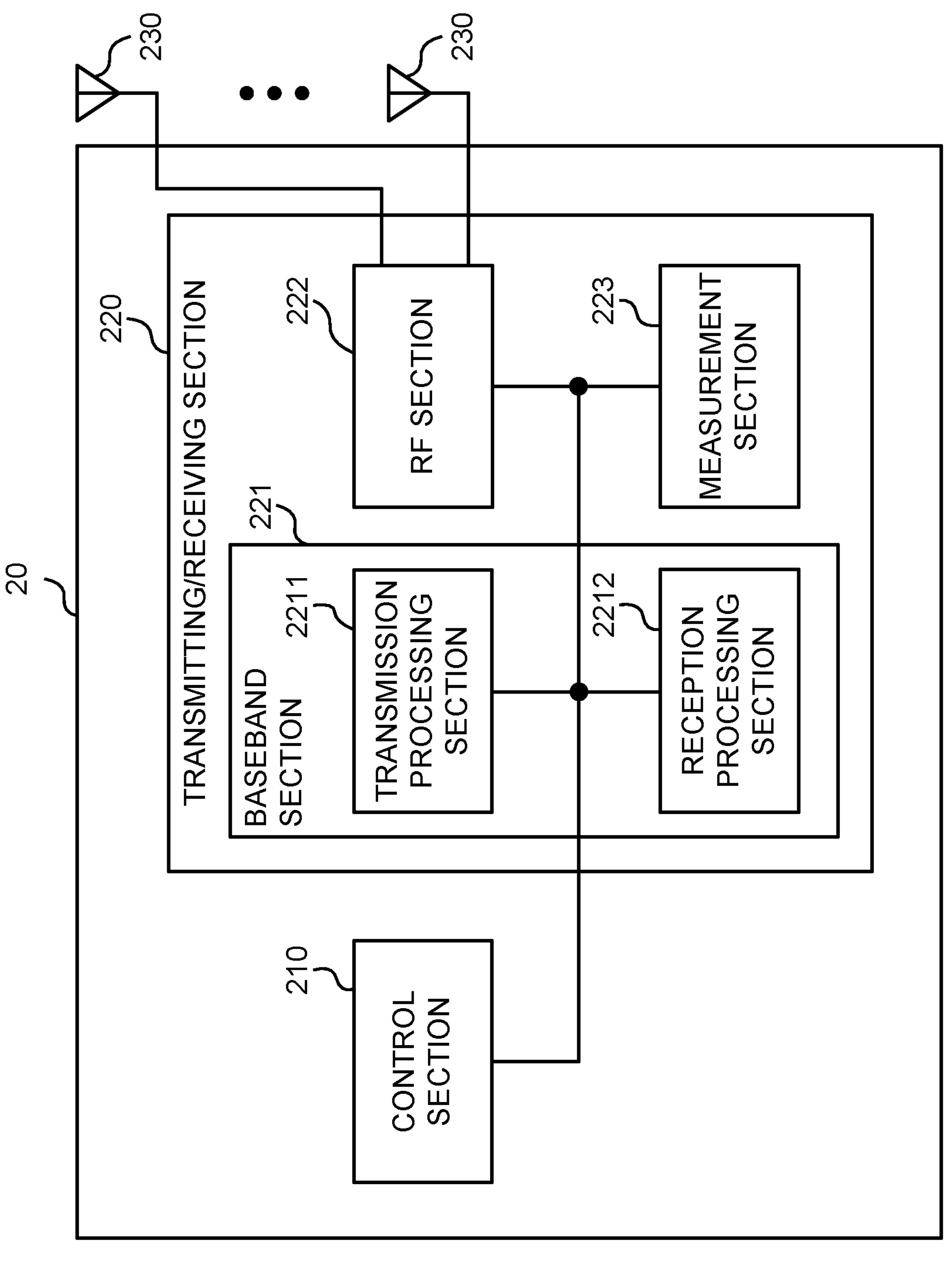
FIG. 15 is a diagram to show an example of a structure of a user terminal according to one embodiment.

FIG. 15 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The control section 210 may select a beam to be reported, based on at least one of an uplink (UL) beam quality and a downlink (DL) beam quality.

The transmitting/receiving section 220 may transmit a beam report including at least one of the UL beam quality and the DL beam quality of the selected beam.

The control section 210 may select the beam to be reported, based on the DL beam quality, and the transmitting/receiving section 220 may transmit the beam report including the UL beam quality of the selected beam.

The transmitting/receiving section 220 may, when the beam report includes a DL beam report and a UL beam report, receive a configuration of each of number of the DL beam reports and number of the UL beam reports. The transmitting/receiving section 220 may transmit the beam report including the DL beam quality according to the number of the DL beam reports and the UL beam quality according to the number of the UL beam reports.

The transmitting/receiving section 220 may, when the beam report includes a DL beam report and a UL beam report, receive a configuration of a total number of number of the DL beam reports and number of the UL beam reports. The transmitting/receiving section 220 may transmit the beam report including the DL beam quality and the UL beam quality according to the total number.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 16:
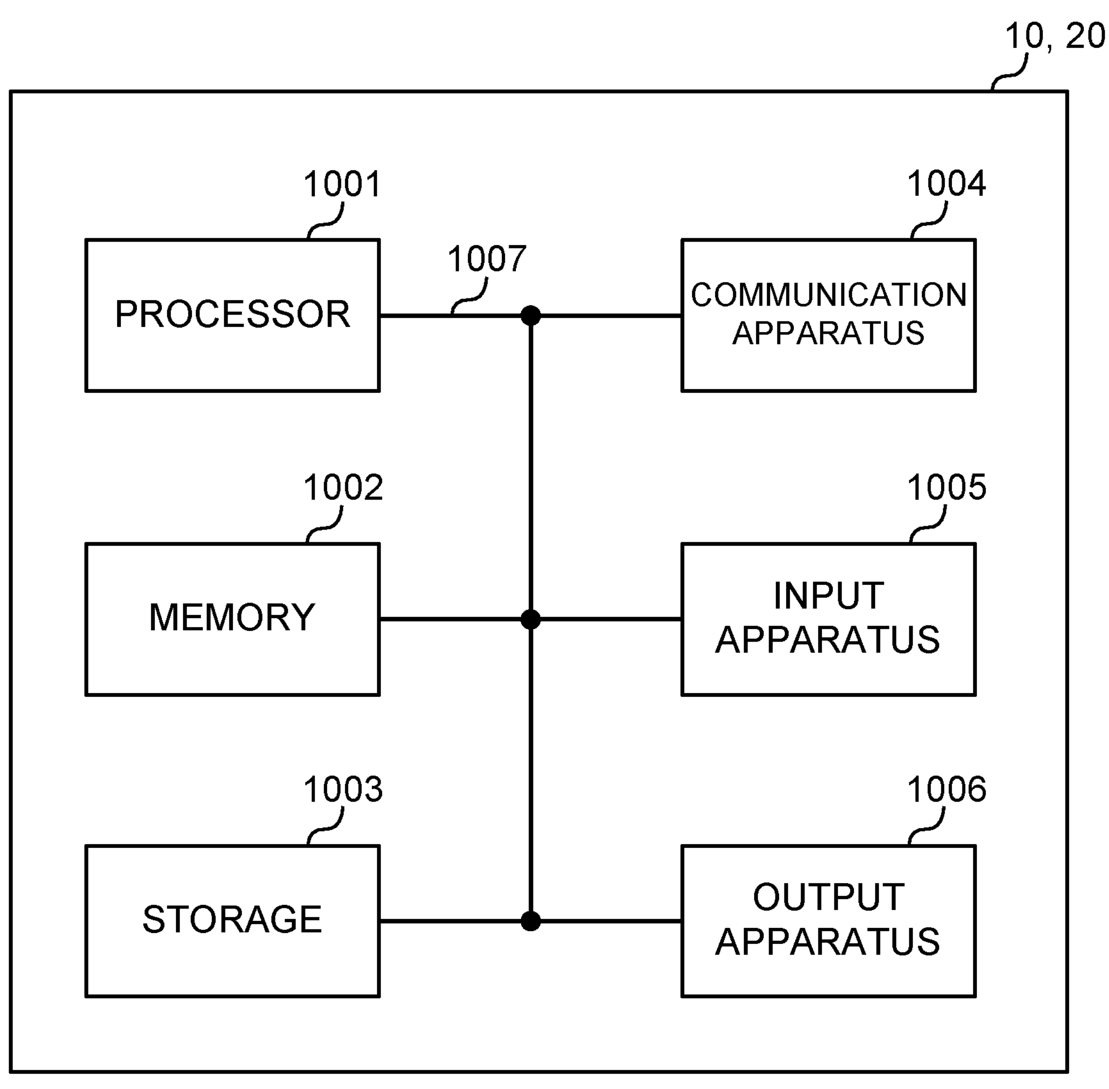
FIG. 16 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 16 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "sidelink"). For example, an uplink channel, a downlink channel and so on may be interpreted as a sidelink channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:

a receiver that, when a beam report to be transmitted is configured to include a downlink (DL) beam report and an uplink (UL) beam report, receives a configuration of a common number corresponding to each of a number of DL beam reports and a number of UL beam reports;

a processor that selects a beam to be reported, based on UL quantized reference signal received power (RSRP) and DL quantized RSRP; and a transmitter that transmits the beam report including: the DL quantized RSRP corresponding to the common number, and the UL quantized RSRP corresponding to the common number.

2. A radio communication method for a terminal, comprising:

when a beam report to be transmitted is configured to include a downlink (DL) beam report and an uplink (UL) beam report, receiving a configuration of a common number corresponding to each of a number of DL beam reports and a number of UL beam reports;

selecting a beam to be reported, based on UL quantized reference signal received power (RSRP) and DL quantized RSRP; and transmitting the beam report including: the DL quantized RSRP corresponding to the common number, and the UL quantized RSRP corresponding to the common number.

3. A base station comprising:

a transmitter that, when a beam report to be transmitted is configured to include a downlink (DL) beam report and an uplink (UL) beam report, transmits a configuration of a common number corresponding to each of a number of DL beam reports and a number of UL beam reports; and a receiver that receives the beam report for a beam to be reported selected based on UL quantized reference signal received power (RSRP) and DL quantized RSRP, the beam report including the DL quantized RSRP corresponding to the common number and the UL quantized RSRP corresponding to the common number.

4. A system comprising a terminal and a base station, wherein the terminal comprises:

a receiver that, when a beam report to be transmitted is configured to include a downlink (DL) beam report and an uplink (UL) beam report, receives a configuration of a common number corresponding to each of a number of DL beam reports and a number of UL beam reports;

a processor that selects a beam to be reported, based on UL quantized reference signal received power (RSRP) and DL quantized RSRP; and a transmitter that transmits the beam report including: the DL quantized RSRP corresponding to the common number, and the UL quantized RSRP corresponding to the common number, and the base station comprises:

a receiver that receives the beam report.

* * * * *